(12) United States Patent
Weng

(10) Patent No.: US 10,482,208 B2
(45) Date of Patent: Nov. 19, 2019

(54) CODING AND SYNTHESIZING A STATE MACHINE IN STATE GROUPS

(71) Applicant: Tianxiang Weng, El Monte, CA (US)

(72) Inventor: Tianxiang Weng, El Monte, CA (US)

(73) Assignee: Tianxiang Weng, El Monte, CA (US)

( * ) Notice: Subject to any disclaimer, the term of this patent is extended or adjusted under 35 U.S.C. 154(b) by 0 days.

(21) Appl. No.: 16/237,657

(22) Filed: Dec. 31, 2018

(65) Prior Publication Data

US 2019/0138679 A1    May 9, 2019

(51) Int. Cl.
  *G06F 17/50* (2006.01)
  *G06F 1/04* (2006.01)
  *G06F 1/3237* (2019.01)

(52) U.S. Cl.
  CPC ............ *G06F 17/5045* (2013.01); *G06F 1/04* (2013.01); *G06F 1/3237* (2013.01)

(58) Field of Classification Search
  CPC ...... G06F 1/04; G06F 1/3237; G06F 17/5045; G06F 2217/78
  See application file for complete search history.

(56) References Cited

U.S. PATENT DOCUMENTS

| 6,202,166 B1 | 3/2001 | Tang | |
| 6,586,969 B1 * | 7/2003 | Koe | G06F 1/24 326/38 |
| 2006/0161404 A1 * | 7/2006 | Campbell | G06F 11/3688 703/2 |

OTHER PUBLICATIONS

Benini et al., "Automatic Synthesis of Low-Power Gated-Clock Finite-State Machines", IEEE Transactions on Computer-Aided Design of Integrated Circuits and Systems, vol. 15, No. 6, Jun. 1996, pp. 630-643 (Year: 1996).*
"Group declaration." VHDL-online, via Internet Archive Wayback Machine, https://web.archive.org/web/20170207045452/https://www.vhdl-online.de/vhdl_reference_93/group_declaration(Year: 2017).*

* cited by examiner

Primary Examiner — Jack Chiang
Assistant Examiner — Aric Lin

(57) ABSTRACT

The present invention provides theoretical bases and practical schematic diagrams for a state machine which is coded in HDL and synthesized to generate a circuit that comprises one or more state groups each of which has an independent clock gating device. A state group will receive a clock pulse on the next cycle when either a synchronous initialization input signal for a state machine is asserted on the current cycle or the state group will change states on the next cycle, reducing power consumption and simplifying the final logic, compared with a traditionally generated state machine circuit. In addition the invention also provides a code designer with a proposed method for HDL standard on how to divide all states in a state machine into state groups at his discretion.

17 Claims, 5 Drawing Sheets

US 10,482,208 B2

CODING AND SYNTHESIZING A STATE MACHINE IN STATE GROUPS

BACKGROUND OF THE INVENTION

1. Field of the Invention

The present invention relates to the manufacture of digital integrated circuits (IC), and more particularly to the fabrication of clock-gated deterministic finite state machines in ASIC and FPGA, and the state machines are coded in Hardware Description Language (HDL).

2. Description of Related Art

A synchronous digital circuit usually consists of combinatorial logic, latches, registers, state machines, input and output circuits. Data flows through a digital system from the input circuit to the output circuit. State machines are used to control data flows on every cycle and play key roles in synchronous digital circuits.

Any method reducing state machine power consumption is valuable if it is feasible, especially if the method also leads to simpler logic than what may be generated by any traditional synthetizations and can be made into the standard for all VHD languages shared by all HDL engineers around the world.

A state machine in a synchronous digital design needs a clock source to drive. The present invention allows designers to divide states into state groups (SG). An SG may include from one state to all states in the state machine and will receive a clock pulse only when the state machine is being initialized or the SG will change states on next cycle, reducing power consumption.

Traditionally a deterministic finite state machine is mathematically defined as a set of 6-tuple $M=(\Sigma, \Delta, Q, q0, \delta, \lambda)$, where $\Sigma$ is a finite set of input symbols, $\Delta/=0$ is a finite set of output symbols, $Q/=0$ is a finite set of states, $q0 \in Q$ is the "reset" state, $\delta(q, a): Q \times \Sigma \rightarrow Q$ is the transfer function, and $\lambda(q, a): Q \times \Sigma \rightarrow \Delta$ is the output function.

Conventional state machine theory has following State Machine Axiom:

State Machine Axiom A state machine has one and only one state being active on any cycle after the state machine is properly initialized.

Here are some prior art conventions used in the description of present invention. This paragraph recites the conventional meaning of some terms common used in art and simplified forms as used in this specification.

1) A synchronous deterministic finite state machine is simply called a state machine.
2) A signal is said to be in assertion high logic if the signal is asserted when it is logic 1, and deasserted when it is logic 0. In the present invention the assertion high logic is used for all signals.
3) A state in a state machine is called active if the state's signal is asserted on current cycle.
4) The asynchronous initialization input signal RESET skips for simplicity without loss of generality, because its definition and implementation are well known in the art and have no change in the present invention if it is included in a circuit.
5) A synchronous initialization input signal for a state machine always exists and is called input signal SINI. The initial state of the state machine will be active one cycle after input signal SINI is asserted.
6) All discussions involving a state machine are under the assumption that the state machine is properly initialized by an asserted input signal SINI.
7) A state in a state machine is called current state if it is active on current cycle.
8) A state in a state machine is called next state if it will be active on next cycle.
9) A signal is said to be currently asserted if the signal is asserted on current cycle.
10) A state machine is said to change states on next cycle if the state machine's next state is different from its current state.
11) A state machine is said to make no state changes on next cycle if its next state is the same as its current state.
12) An output from a state machine is called a state output if the output indicates the status of a state in the state machine. A state output is always assumed to be a bit.
13) All states in a state machine can be memorized using one of 2 encoding methods:
    a) An encoding method is called one-hot encoding method for a state machine if the method uses n-bits to memorize n states, one asserted bit to represent an active state, and has only one bit asserted and other bits deasserted on any cycle.
    b) An encoding method is called compact encoding method for a state machine if the method uses m-bits to memorize n states, m<n, and one of n valid m-bit permutations to represent one active state of the n states. M-bits can be used to memorize at most $2^m$ states.

FIG. 1 is an interface diagram for any type of clock gating device currently known in the art. These types of clock gating devices have their clock input '>' coupled to a state machine's clock source, with its clock pulse output C driving a clock pulse on next cycle if the clock enable input E is asserted on current cycle.

BRIEF SUMMARY OF THE INVENTION

Working principles of the present invention:
1) A piece of combinatorial logic Tij is defined as a jumping signal for a state machine, and Tij is generated based on following logic expression:

$Tij=$(not $SINI$) and $Si$ and $F(x)$; where a) Signal SINI is the synchronous initialization input signal for the state machine;
   b) State Si is Tij's current state;
   c) Signal x is the state machine's input signals;
   d) Transfer function F(x) maps input signals x to a bit signal, and the input signals x do not comprise information of the state machine; and
   e) Tij's index j indicates that state Sj is Tij's target state.
2) All states are grouped into one or more SGs by a designer or a synthesizer, and an SG may have from one state to all states in the state machine.
3) Attach each of SGs with a clock gating device.
4) Define a jumping signal as a true jumping signal for an SG if the jumping signal's current state and target state are different, and the target state belongs to the SG.
5) Feed each state of an SG with all true jumping signals whose target state is that state.
6) An SG will change states on next cycle if the SG has at least one of the currently asserted jumping signal's current state or target state, and the current state and the target state are 2 different states.

7) Generate a clock pulse to an SG on next cycle when either input signal SINI is asserted on current cycle or the SG will change states on next cycle.

DETAILED DESCRIPTION OF THE INVENTION

Figure 1:
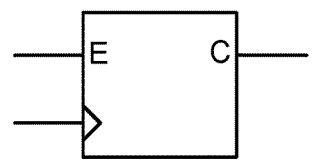
FIG. 1 is an interface diagram for any type of clock gating device currently known in the art.

Here is a set of new definitions and rules to facilitate the understanding and embodiments of the present invention.
1) An internal signal is defined as a jumping signal for a state machine if it has following characteristics:
   a) It has a current state.
   b) It has a target state.
   c) It has a transfer function that doesn't include information of the state machine.
   d) It is deasserted when input signal SINI is asserted.
   e) The state machine will jump from the current state to the target state of a currently asserted jumping signal on next cycle.
   f) One and only one jumping signal is asserted on any cycle after the state machine is initialized.
2) The current state of a state machine is called the current state of a jumping signal if the jumping signal is asserted on current cycle.
3) A jumping signal is called a jumping signal from state Si if the jumping signal has current state Si.
4) A jumping signal is called a jumping signal of state Sj if the jumping signal has target state Sj.
5) All states are grouped into one or more SGs either by a designer or by a synthesizer.
6) Each SG has one or more states.
7) Each state of a state machine belongs to only one SG.
8) Attach each of the SGs with a clock gating device.
9) An SG is called active when one of its states is active, or inactive otherwise.
10) An SG is called the initial SG for a state machine if it has the initial state of the state machine. The other SGs are called non-initial SGs.
11) A jumping signal is said to belong to an SG if the SG has at least one of the jumping signal's current state or target state.
12) A jumping signal is defined as a true jumping signal for an SG if the jumping signal's current state and target state are different, and its target state belongs to the SG.
13) A true jumping signal is called an entry jumping signal for an SG if the SG does not have the true jumping signal's current state.
14) A true jumping signal is called a local jumping signal for an SG if the SG has the true jumping signal's current state.
15) A jumping signal is called a leaving jumping signal for an SG if the SG has the jumping signal's current state and does not have its target state.
16) A jumping signal is called a crossing jumping signal for a state machine if the jumping signal's current state and target state belong to 2 different SGs.
17) A crossing jumping signal belongs to two SGs: a) the SG has the crossing jumping signal's current state and the crossing jumping signal is used as a leaving jumping signal for the SG; and b) if the SG has the crossing jumping signal's target state and the crossing jumping signal is used as an entry jumping signal for the SG.
18) A jumping signal is called a holding jumping signal for an SG if the SG has the jumping signal's current state and target state, and both are the same.
19) An SG is said to have a currently asserted jumping signal on current cycle if the currently asserted jumping signal belongs to the SG.
20) An encoding method is called group one-hot encoding method for an SG which has n states in a state machine if the state machine has more than one SG, the method uses n-bit memory to memorize the n states in the SG, each of n-bit permutations of one asserted bit and other (n−1) deasserted bits to represent one active state of the n states in the SG, the all deasserted n-bit permutation to represent the inactive status of the SG, and the n-bits have either one bit or none of the n-bits asserted on any cycle after the state machine is initialized.
21) An encoding method is called group compact encoding method for an SG which has n states in a state machine if the state machine has more than one SG, the method uses m-bit memory to express (n+1) valid m-bit permutations (m<n): a) each of the n valid m-bit permutations represents one active state of the n states in the SG, and b) the last valid m-bit permutation represents the inactive status of the SG. M-bits can memorize at most ($2^m-1$) states in the SG.
22) An input bit for a state in a SG or in a state machine is called next state input bit for the state: a) if the input bit is asserted on current cycle, a clock pulse will be generated for the SG or the state machine, and the state will change state from being inactive on current cycle to being active on next cycle; b) if the input bit is deasserted on current cycle and no cycle pulse will be generated for the SG or the state machine on next cycle, the state will remain unchanged on next cycle; c) if the input bit is deasserted on current cycle and a clock pulse will be generated for the SG or the state machine on next cycle, the state will be inactive on next cycle.

23) A state is called the special state in a state machine if the state does not have its next state input bit, and the state is active if none of the other states in the state machine is active on current cycle, or inactive otherwise. Any state in a state machine can be selected to be the special state based on any preferred conditions.

24) An encoding method is called global one-hot encoding method for a state machine which has (n+1) states if: a) the method uses n-bit memory and (n+1) valid n-bit permutations to memorize the (n+1) states; b) each of the n states has its own next state input bit, and the remaining one state is the special state which does not have its own next state input bit; c) each of the n n-bit permutations of each of one asserted bit and other (n−1) deasserted bits represents one state of the n states; d) the permutation of the all deasserted n-bits represents the special state; e) the n-bits have either one bit or none of the n-bits asserted on any cycle after the state machine is initialized; and f) a state of the (n+1) states is active on current cycle when the permutation of the n-bits on current cycle has the permutation that represents the state, or inactive otherwise.

25) An encoding method is called global compact encoding method for a state machine which has (n+1) states if: a) the method uses m-bit memory and (n+1) valid m-bit permutations to memorize the (n+1) states, m<(n+1); b) each of the (n+1) valid m-bit permutations represents one state of the (n+1) states; c) one state is the special state which does not have its own next state input bit, and each of the remaining n states has its own next state input bit; d) the n next state input bits have one bit or none of the n-bits asserted on any cycle after the state machine is initialized; e) each of the n permutations of the n not-all deasserted next state input bits is mapped to one permutation of the n valid m-bit permutations that represents one state of the n states; f) the permutation of the n all deasserted next state input bits is mapped to the remaining valid m-bit permutation that represents the special state; and g) a state of the (n+1) states is active on current cycle when the permutation of the m-bits on current cycle has the permutation that represents the state, or inactive otherwise. M-bits can memorize at most $2^m$ states.

How to Group States by Code Designers

A new enumeration group type is suggested in HDL to provide code designers with capability to arbitrarily group states in a state machine in order to generate one or more SGs with each having a clock gating device. The part in bold font is newly introduced and the part in regular font is in original definition in VHDL-2002.

```
...;
scalar_type_definition ::=
    enumeration_type_definition
```

-continued

```
    | enumeration_group_type_definition
    | integer_type_definition
    | floating_type_definition
    | physical_type_definition
enumeration_type_definition ::=
    ( enumeration_literal { , enumeration_literal } )
enumeration_literal ::= identifier | character_literal
enumeration_group_type_definition ::=
    ( enumeration_group_element { , enumeration_group_element } )
enumeration_group_element ::= [ group_label : ]
enumeration_group_literal
enumeration_group_literal :: =
    ( enumeration_literal { , enumeration_literal } )
    | enumeration_literal
group_label ::= label
...;
```

All code examples in the present invention are coded in VHDL which is used as a representative language for HDL. The following code snippet in pseudo VHDL declares a state machine signal WState, its next state signal WState_NS and initial state S0. They will be used later.

Type WState_type is (S0, S1, . . . , Sn);
Signal WState, WState_NS: WState_type;

A state machine declaration example is shown below, demonstrating how states in a state machine declaration can be grouped together by a code designer under any preferred grouping conditions at his discretion. Before the above grammar is accepted by HDL standard, a synthesizer still can use the present invention by using its circuit analysis capability to group the states of a state machine to generate SGs with each having a clock gating device to reduce power consumption.

```
...;
type WState_type is (
    Initial : S0,      -- optionally it can be written as: Initial :( S0),
    First : (S11, S12),   -- group names are optional
    Second : (S21, S22, S23),
    Third : (S31, S32, S33, S34)
);
signal WState, WState_NS : WState_type;
...;
```

Basic Theories

Theorem 1 A jumping signal in a state machine can be expressed by an equation:

$Tij$=not $SINI$ and $Si$ and $F(x)$; where

1) Signal Tij is a bit and represents a jumping signal.
2) Signal SINI is a bit and is the synchronous initialization input signal for the state machine.
3) State Si is a bit and is Tij's current state.
4) Transfer function F(x) maps one or more input signals x of the state machine to a bit. The input signals x do not comprise information of the state machine.
5) Index j in jumping signal Tij indicates that a state Sj with index j in the state machine represents Tij's target state.

Proof (not SINI) is necessary because the definition of a jumping signal requires that all jumping signals of a state machine be deasserted if SINI is asserted. State Si is necessary because a jumping signal is asserted only when its current state Si is active. Function F(x) is decided by the characteristic of a jumping signal: the state machine will jump from the current state to the target state of a currently asserted jumping signal on next cycle. That F(x) does not have any state information must be proved. Assuming that a) (not a) is treated as a new input signal, and b) (a xor b) is treated as: ((not a) and b) or (a and (not b)), there are only 2 types of logic operators in function F(x): logic operator and, and logic operator or. Without loss of generality, function F(x) can be expressed in general form as: F(x)= (Term_a or Term_b or . . . or Term_z); where Term_s=(s_1 and s_2 and . . . and s_y), and s_x is an input signal or a state of the state machine. If F(x) has a term which comprises a state, the state would be either the current state or other state in the state machine. If the state is the current state Si, it has already been extracted from the term as shown as a factor Si of Tij because (Si and Si)=Si. If the state is different from the current state Si, the different state is inactive because only the current state of a currently asserted jumping signal is active on any cycle, and any term containing a different state from current state Si should be dropped from F(x). Target state information index j will be reflected in the jumping signal's connection in the circuit.

Here is a code snippet in pseudo VHDL, showing how the logic for a jumping signal is generated, and a systematic method generating all jumping signals skips and is not elaborated in the present invention.

```
type State_Type is ( S0, S1, ...);
signal WState, WState_NS : State_Type;
...;
a : process(CLK)
begin
    if rising_edge(CLK) then
        if SINI then
            WState <= S0;
        else
            WState <= WState_NS;
        end if;
    end if;
end process;
b : process(all)
begin
    case WState is
        when S0 =>
            if C1 then
                WState_NS <= S1;
            elsif C2 then
                WState_NS <= S2;
            else
                WState_NS <= S0;
            end if;
        ...;
    end case;
end process;
```

Now a synthesizer must generate a signal S0_C1 as follows:
S0_C1<not SINI and WState=S0 and C1;
Signal S0_C1 is called a jumping signal for the state machine. When S0_C1 is asserted, WState will go from state S0 to state S1 on next cycle.

Theorem 2 A jumping signal of a SG in a state machine can be classified into one of 4 categories if the state machine has more than one SG: an entry jumping signal, a leaving jumping signal, a local jumping signal or a holding jumping signal.

Proof The classification is based on whether or not the jumping signal's current state and target state are located in the SG:
1) An entry jumping signal: its target state is in the SG and its current state is not.
2) A leaving jumping signal: its current state is in the SG and its target state is not.
3) A holding jumping signal: both its current state and target state are the same and in the SG.
4) A local jumping signal: both its current state and target state are in the SG, and they are different.

It is important to note the fact that an SG has a specific jumping signal doesn't mean that a circuit for the SG must actually involve the specific jumping signal, because a better circuit for the SG may exist without using the specific jumping signal.

Theorem 3 An SG has all its states inactive on both current cycle and next cycle if the SG has no currently asserted jumping signal on current cycle.

Proof If the SG has no currently asserted jumping signal on current cycle, the current state and the target state of the currently asserted jumping signal do not belong to the SG; the current state is active on current cycle, the target state of the currently asserted jumping signal will be active on next cycle, and there is only one active state on any cycle, resulting in that the SG has all its states inactive on both current cycle and next cycle.

Theorem 4 An SG will change states on next cycle if the currently asserted jumping signal's current state and target state are different, and the SG has at least one of the currently asserted jumping signal's current state or target state.

Proof Based on the assumption that the currently asserted jumping signal's current state and target state are different, if the SG has the currently asserted jumping signal's current state, the current state is active on current cycle and will be inactive on next cycle; and if the SG has the currently asserted jumping signal's target state, the target state is inactive on current cycle and will be active on next cycle. In both situations the SG will change states.

Figure 2:
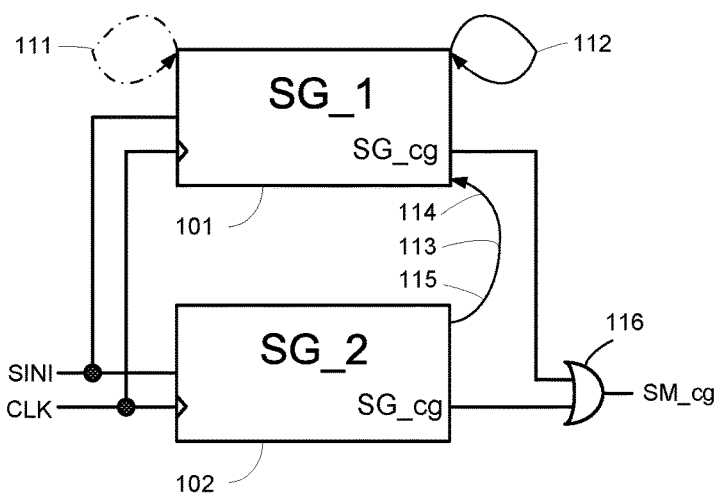
FIG. 2 is a demonstration block diagram of an exemplary state machine which has 2 SGs, showing one example for each of 4 types of jumping signals and how they act with their related SG.

FIG. 2 is a demonstration block diagram of an exemplary state machine which has 2 SGs, showing one example for each of 4 types of jumping signals and how they act with their related SG. The state machine has 2 SGs SG_1 101 and SG_2 102. SG 101 has the initial state and is the initial SG; SG 102 is the non-initial SG. Clock source CLK and input signal SINI drive both of SGs 101 and 102. One cycle after SINI is asserted, SG 101 has its initial state active and all other states of the state machine are inactive. Holding jumping signal 111 of SG 101 is drawn in a dotted line, indicating its assertion never changes states for the SG. Local jumping signal 112 of SG 101 will change states for SG 101 on next cycle if it is asserted on current cycle, activating its target state and deactivating its current state in SG 101 on next cycle. A crossing jumping signal 113 from SG 102 to SG 101 splits to 2 jumping signals, one is called entry jumping signal 114 for SG 101, and another is called leaving jumping signal 115 for SG 102. When crossing jumping signal 113 is asserted on current cycle, it will activate its target state in SG 101 and deactivate its current state in SG 102 on next cycle. Each of SGs 101 and 102 has a state change output signal SG_cg available without cost. Output signal SG_cg for a SG is asserted when the SG will change states on next cycle, or deasserted otherwise. All SG_cg signals for a state machine are or-ed together through or-gate 116 to generate a global stage change output signal SM_cg for the state machine if needed. Output signal SM_cg is asserted on current cycle if the state machine will have state changes on next cycle, or deasserted otherwise. All other inputs and outputs for the state machine are not drawn.

Figure 2A:
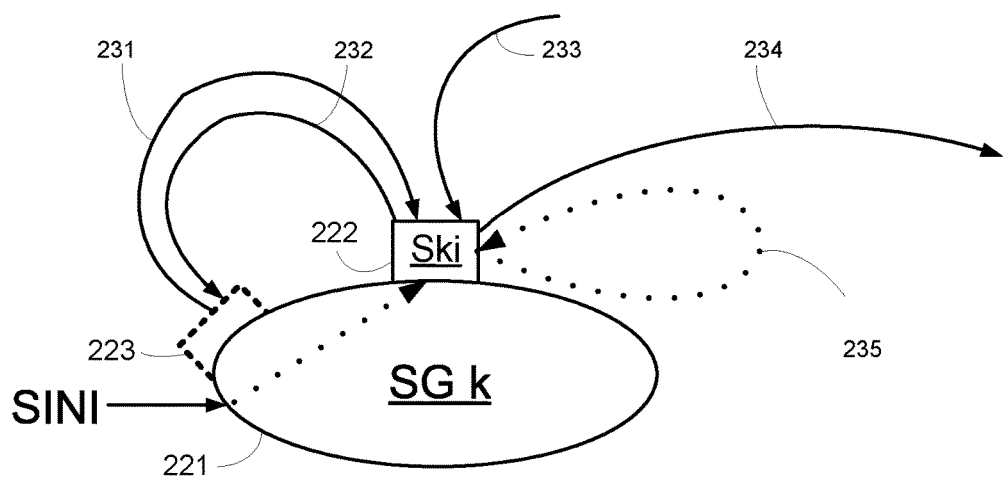
FIG. 2A is a demonstration block diagram of an exemplary SG, showing one example for each of four types of jumping signals and how they act internally in the SG.

FIG. 2A is a demonstration block diagram of an exemplary SG, showing one example for each of four types of jumping signals and how they act internally in the SG. It is assumed that the state machine in FIG. 2A has more than one SG. 221 is an SG k which has input signal SINI drawn and other inputs/outputs not drawn. 222 represents state Ski within SG k. Input SINI has a dotted line connected to state Ski, emphasizing that the dotted line exists only when state Ski is the initial state. When state Ski is the initial state, one cycle after input signal SINI is asserted, state Ski is active and other states are inactive. 223 represents other states which have connections to state Ski through jumping signals in SG 221. A state in an SG is related with at most four types of jumping signals: entry jumping signals, leaving jumping signals, local jumping signals and holding jumping signals. Each of lines with black arrow but SINI represents a jumping signal and the black arrow points to the jumping signal's target state. A local jumping signal relating to state Ski has 2 directions: a) a local jumping signal 231 of state Ski which has state Ski as its target state and its current state being another state in SG 221; and b) a local jumping signal 232 from state Ski which has state Ski as its current state and its target state being another state in SG 221. An entry jumping signal 233 of state Ski has state Ski as its target state and its current state being in another SG. A leaving jumping signal 234 from state Ski has state Ski as its current state and its target state being in another SG. A holding jumping signal 235 of state Ski has state Ski as its current state and target state, and is drawn in a dotted line, emphasizing its assertion never changes state Ski on any cycle.

How to Generate State Outputs Based on Available Jumping Signals

Figure 3:
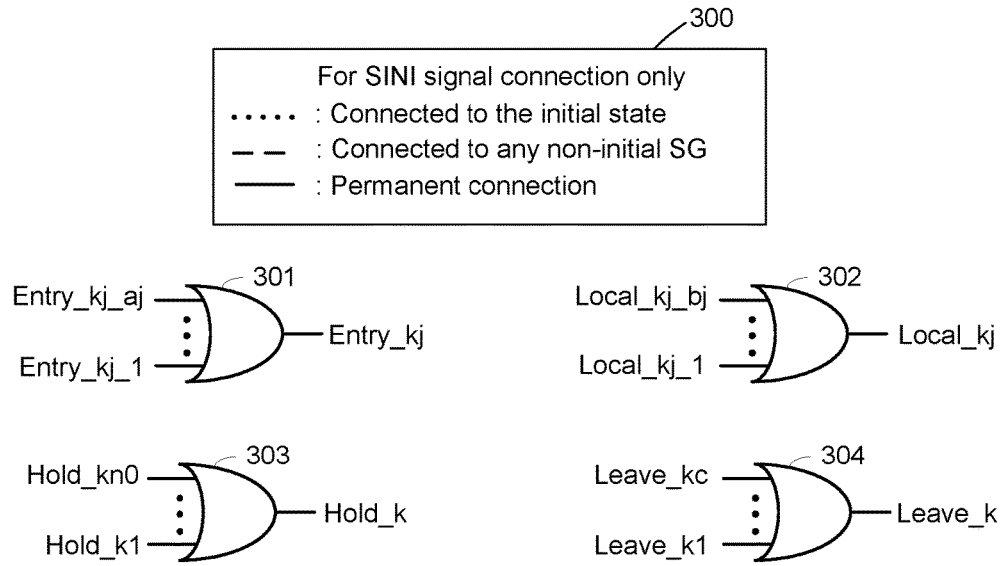
FIG. 3 shows a legend 300 and 4 schematic diagrams which will be used later.

FIG. 3 shows a legend 300 and 4 schematic diagrams which will be used later. Legend 300 shows how 3 types of input signal SINI are connected in an SG: a) a dotted line is used in an SG if the SG is the initial SG and the state connected to SINI is the initial state; b) a dash line is used in an SG if the SG is a non-initial SG; and c) a regular line is used in an SG if input signal SINI is permanently connected to the SG. SG k in present invention is assumed to have states Sk1-Skn0 unless specified otherwise. Or-gate 301 has all entry jumping signals of state Skj from entry_kj_1 to entry_kj_aj as its inputs and outputs a combined entry jumping signal entry_kj of state Skj. Entry_kj is asserted if one of entry jumping signals of state Skj is asserted, or deasserted otherwise. Or-gate 302 has all local jumping signals of state Skj from local_kj_1 to local_kj_bj as its inputs and outputs a combined local jumping signal local_kj of state Skj. Local_kj is asserted if one of local jumping signals of state Skj is asserted, or deasserted otherwise. It is assumed that each state in a state machine has only one holding condition without loss of generality, or-gate 303 has all holding jumping signals in SG k from Hold_k1 to Hold_kn0 as its inputs and outputs combined holding jumping signal Hold_k of SG k. Hold_k is asserted if one of holding jumping signals in SG k is asserted, or deasserted otherwise. Or-gate 304 has all leaving jumping signals from SG k from Leave_k1 to Leave_kc as its inputs and outputs combined leaving jumping signal Leave_k from SG k. Leave_k is asserted if one of leaving jumping signals from SG k is asserted, or deasserted otherwise. For a combined jumping signal, its name suffix "_k" refers to SG k and its name suffix "_kx" refers to the combined jumping signal's target state Skx in SG k.

Figure 9:
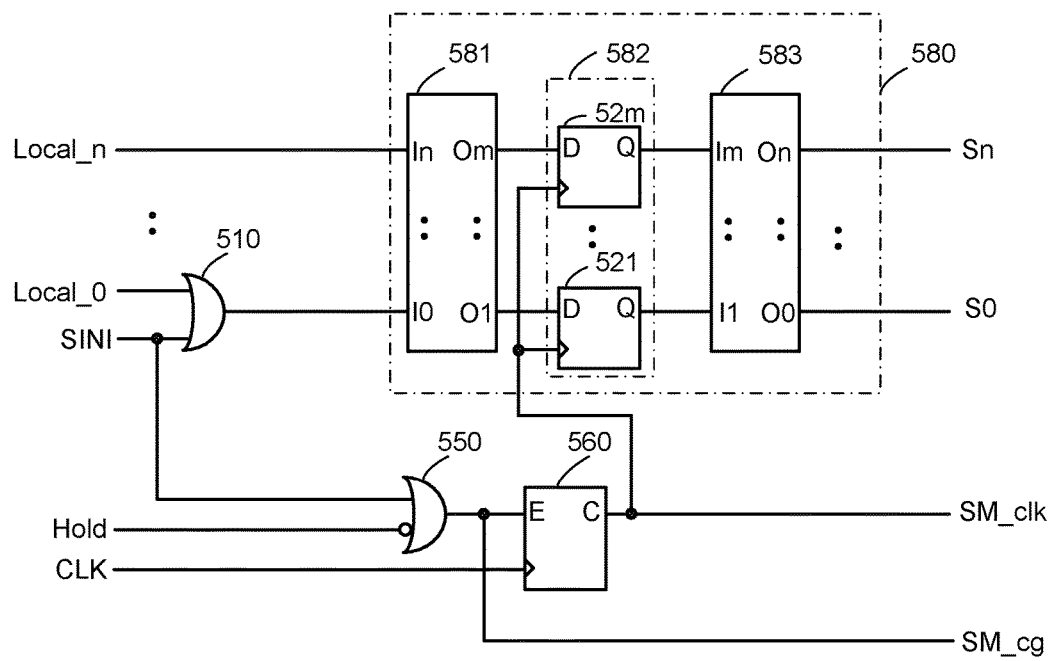
FIG. 9 is a schematic diagram of a full state machine using the compact encoding method and a clock gating device according to the sixth embodiment.
Figure 10:
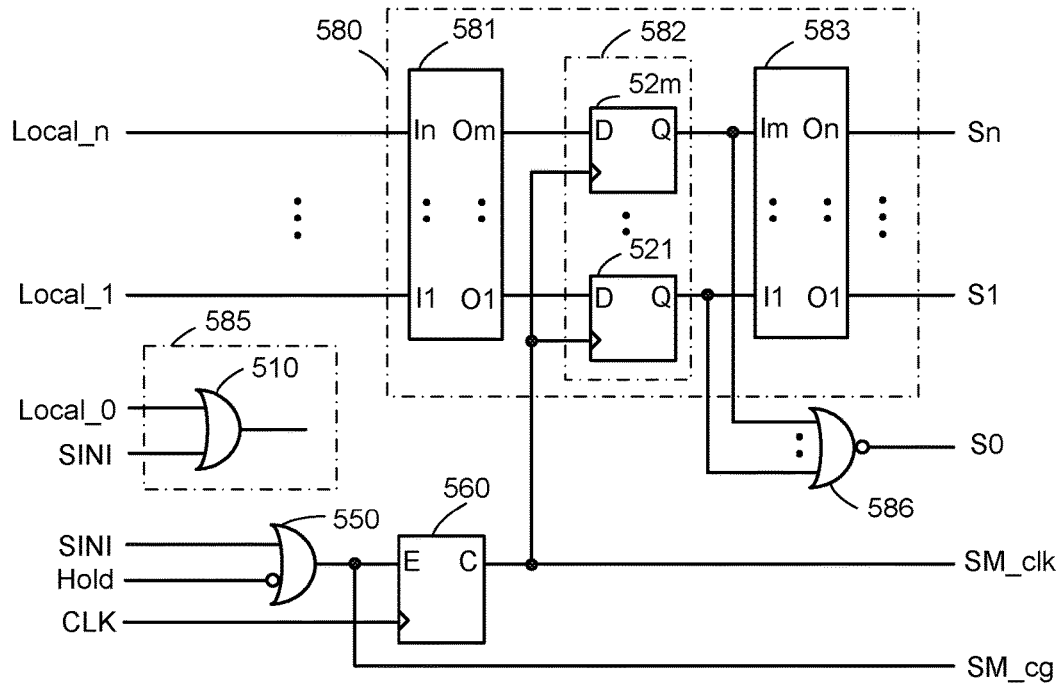
FIG. 10 is an optimized schematic diagram of a full state machine using the global compact encoding method and having a clock gating device according to the seventh embodiment.
Figure 11:
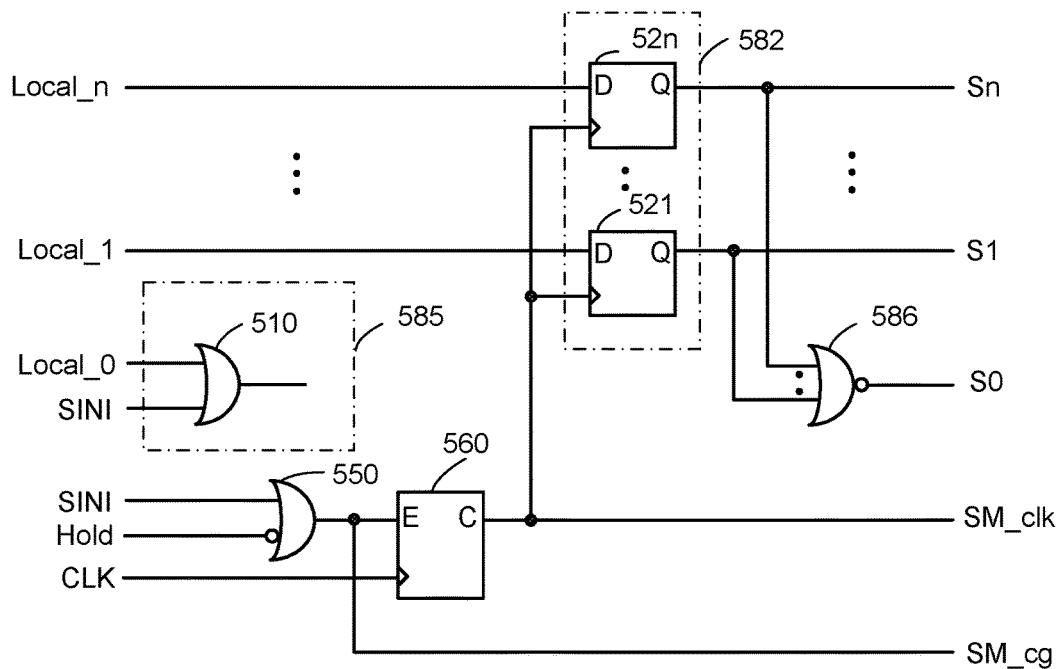
FIG. 11 is an optimized schematic diagram of a full state machine using the global one-hot encoding method and having a clock gating device according to the eighth embodiment.

It is assumed that a state machine has more than one SG in FIG. 4-FIG. 8, and has only one SG in FIG. 9-FIG. 11 that means that the present invention not only applies to multiple SGs, but also to the case where a state machine is the only one SG.

Figure 4:
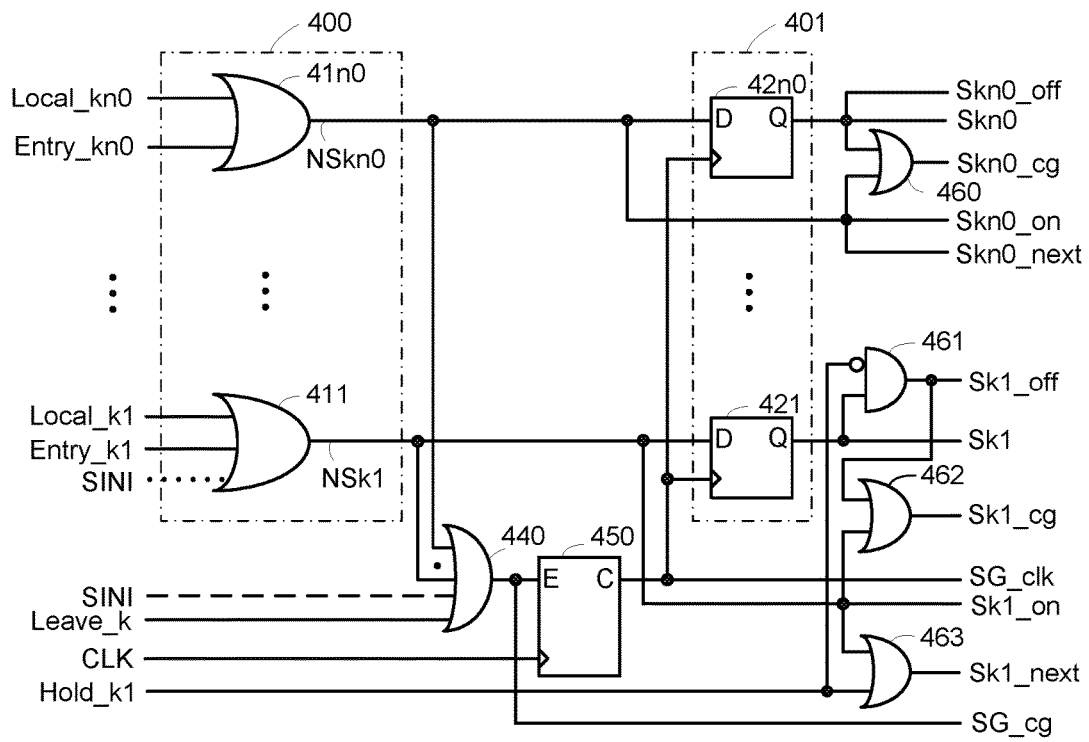
FIG. 4 is a schematic diagram for an SG in a state machine according to the first embodiment, where the group one-hot encoding method is used and the state machine has more than one SG.

FIG. 4 is a schematic diagram for an SG in a state machine according to the first embodiment, where the group one-hot encoding method is used and the state machine has more than one SG. Input block 400 is a logic block which generates next state input bit NSkj for each state Skj, $1 \leq j \leq n0$, in the SG. Each or-gate $41j$, $1 \leq j \leq n0$, generally has 2 types of inputs: a combined entry jumping signal Entry_kj of state Skj and a combined local jumping signal Local_kj of state Skj. Entry_kj of state Skj is absent if the state machine has only one SG; Local_kj of state Skj is absent if the SG has only one state. Or-gate 411 has also input signal SINI connected if state Sk1 is the initial state, or does not have input signal SINI connected otherwise. Or-gate $41j$ also has its output next state input bit NSkj driving data input D of flip-flop (FF) $42j$. Next state input bit NSkj, $1 \leq j \leq n0$, plays a key role: a) if it is asserted on current cycle, a clock pulse will be generated for the SG, and state Skj will change state from being inactive on current cycle to being active on next cycle; b) if it is deasserted on current cycle and no clock pulse will be generated for the SG on next cycle, state Skj will remain unchanged on next cycle; c) if it is deasserted on current cycle and a clock pulse will be generated for the SG on next cycle, state Skj will be inactive on next cycle. Next state input bit NSkj also plays the same important role if a state machine has only one SG. Output block 401 has all state memory bits to store status of states in the SG. $421$-$42n0$ are FFs each of which is used to remember a state's status. FF $42j$, $1 \leq j \leq n0$, has its data output Q driving state output Skj. Output Skj is asserted if state Skj is active on current cycle, or deasserted otherwise. Or-gate 440 has its inputs connected to: a) all next state input bits NSk1-NSkn0; b) combined leaving jumping signal Leave_k from the SG; and c) input signal SINI if the SG is a non-initial SG. Or-gate 440 output drives state change output SG_cg for the SG and enable input E of clock gating device 450. State change output SG_cg is asserted on current cycle if the SG will change states on next cycle. Clock gating device 450 has its clock input '>' connected to the state machine's clock source and its clock pulse output C drives output SG_clk and clock inputs '>' of all FFs $421$-$42n0$. SG_clk is clock output for the SG and may be used for other FFs as a clock pulse source synchronous with the SG. When a state machine has only one state group, state change output SG_cg and clock output SG_clk for an SG become state machine change output SM_cg and state machine clock output SM_clk for the state machine, respectively.

The circuit of an SG can split into 2 parts: a) a memory part which is used to receive state inputs and generate state outputs and remember the status of all states in the SG, and b) a clock pulse generating part which generates a necessary clock pulse for the SG. In FIG. 4 the memory part includes logic blocks 400 and 401, and the clock pulse generating part includes or-gate 440 and clock gating device 450.

Theorem 5 An SG will change states on next cycle if the SG has an asserted true jumping signal on current cycle.

Proof Based on the definition of a true jumping signal, the true jumping signal's current state and target state are different, and the SG has the asserted true jumping signal's target state. It is true based on Theorem 4.

Theorem 6 An SG will change states on next cycle if the SG has an asserted leaving jumping signal on current cycle.

Proof Based on the definition of a leaving jumping signal, the leaving jumping signal's current state and target state are different, and the SG has the asserted leaving jumping signal's current state. It is true based on Theorem 4.

Working principles for the SG circuit in FIG. 4:
1) When input signal SINI is asserted, the SG will receive a clock pulse on next cycle through clock gating device 450, because its enable input E is connected to SINI, regardless of whether state Sk1 is the initial state or not. The SG will be initialized properly on next cycle based on the rule that all jumping signals are deasserted when input signal SINI is asserted.
2) After the state machine is initialized, there are 4 different situations for an SG based on which type of an asserted jumping signal the SG may have on current cycle:
   a) The SG has an asserted true jumping signal, either an entry jumping signal of state Skj or a local jumping signal of state Skj, $1<=j<=n0$. In this situation, next state input bit NSkj is asserted, other next state input bits are deasserted, enable input E of clock gating device 450 is asserted on current cycle, the SG will receive a clock pulse and have state Skj active and other states inactive on next cycle.
   b) The SG has an asserted leaving jumping signal. In this situation, combined leaving jumping signal Leave_k for the SG is asserted, all next state input bits NSkj, $1<=j<=n0$, are deasserted, enable input E of clock gating device 450 is asserted on current cycle, the SG will receive a clock pulse and have all its states Skj, $1<=j<=n0$, inactive on next cycle.
   c) The SG has an asserted holding jumping signal. In this situation, all combined entry jumping signals Entry_kj of state Skj, all combined local jumping signals Local_kj of state Skj, $1<=j<=n0$, and combined leaving jumping signal Leave_k from the SG are deasserted, enable input E of clock gating device 450 is deasserted on current cycle, no clock pulse will be generated and all states in the SG will remain unchanged on next cycle, the active state being active and all remaining inactive states being inactive.
   d) The SG has no asserted jumping signal. In this situation, based on Theorem 3, the SG has all states inactive on current cycle, enable input E of clock gating device 450 is deasserted on current cycle, no clock pulse will be generated and all states in the SG will remain inactive on next cycle.

Generating 7 Extra Output Signals 4 extra outputs Si_on, Si_off, Si_cg and Si_next for a state Si, 2 extra outputs SG_cg and SG_clk for an SG and 1 extra output SM_cg for a state machine are introduced to facilitate the coding and implementation for the output signals. Their introduction is essential because an SG has a circuit structure different from what other conventional synthesization methods may generate. When input signal SINI is asserted, 4 outputs Si_on, Si_off, Si_cg and Si_next for state Si are undefined and output signals SG_cg, SG_clk and SM_cg are valid. Here are their definitions.
1) Si_on: It is state Si's turn-on output signal. It is asserted when the state Si is inactive on current cycle and will be active on next cycle, or deasserted otherwise.
2) Si_off: It is state Si's turn-off output signal. It is asserted when the state Si is active on current cycle and will be inactive on next cycle, or deasserted otherwise.
3) Si_cg: It is state Si's state change output signal. It is asserted when the state Si will change states on next cycle, or deasserted otherwise.
4) Si_next: It is state Si's next state output. It is asserted when the state Si will be active on next cycle, or deasserted otherwise.
5) SG_cg: It is a state change output signal for an SG. It is asserted if the SG will change states on next cycle, or deasserted otherwise.
6) SG_clk: It is the clock pulse output generated by the clock gating device for an SG.
7) SM_cg: It is a global state change output for a state machine. It is asserted if the state machine will change states on next cycle, or deasserted otherwise.

6 Output Signals are Also Accurately Defined by the Following Assignment Statements in VHDL:

```
Si_on    <= WState /= Si and WState_NS = Si;  -- 1: state Si will be on
Si_off   <= WState = Si and WState_NS /= Si;  -- 1: state Si will be off
Si_cg    <= Si_off = '1' or Si_on = '1';      -- 1: state Si will change
Si_next  <= WState_NS = Si;                   -- 1: next status of state Si
SG_cg    <= WState.SG_label /= WState_NS.SG_label;  -- SG changes
SM_cg    <= WState /= WState_NS;              -- state machine changes
```

An additional new signal WState.SG_label.SG_clk is suggested to be used to make SG.clk for an SG available to users, where WState is the state machine signal, SG_label is state group label defined in the state machine signal declaration and SG_clk is the signal drawn in FIG. 4.

It is assumed that state Sk1 has one holding jumping signal Hold_k1 of state Sk1. FIG. 4 has 4 extra output signals Sk1_on, Sk1_off, Sk1_cg and Sk1_next for state S1 to generate. Output signal Sk1_on is directly driven by next state input bit NSk1. Output signal Sk1_on is asserted if state Sk1 is inactive on current cycle and will be active on next cycle, or deasserted otherwise. 2-input and-gate 461 has one input connected to the inverse of holding jumping signal Hold_k1 of state Sk1, another to state Sk1 output and its output drives Sk1_off. The Sk1_off is asserted if state Sk1 is active and holding jumping signal Hold_k1 of state Sk1 is deasserted, or deasserted otherwise. 2-input or-gate 462 has its one input connected to Sk1_on, another to Sk1_off and its output drives state Sk1 change output signal Sk1_cg. Output signal Sk1_cg is asserted if either Sk1_on or Sk1_off is asserted, or deasserted otherwise. 2-input or-gate 463 has its one input connected to next state input bit NSk1, another to holding jumping signal Hold_k1 of state Sk1, and its output drives output signal Sk1_next. Sk1_next is asserted if either of Hold_k1 and NSk1 is asserted, or deasserted otherwise. Or-gate 440's output drives output signal SG_cg. SG_cg is asserted if the SG will change states on next cycle, or deasserted otherwise. SG_clk is directly driven by clock pulse output C of clock gating device 450.

It is assumed that state Skn0 in FIG. 4 does not have its holding jumping signal Hold_kn0 and has following 4 extra output signals Skn0_on, Skn0_off, Skn0_cg and Skn0 next drawn. Their circuits can be deduced from similar circuits for state Sk1 with Hold_kn0 being '0'.

Even though the circuits of 4 output signals Si_on, Si_off, Si_cg and Si_next for state Si in FIG. 4 are drawn for an SG, the circuits also apply to all figures from FIG. 5 to FIG. 11, because all necessary signals to generate them exist in FIG.

5 to FIG. 11 in the same way as in FIG. 4, regardless of whether a state machine is divided or not.

Figure 5:
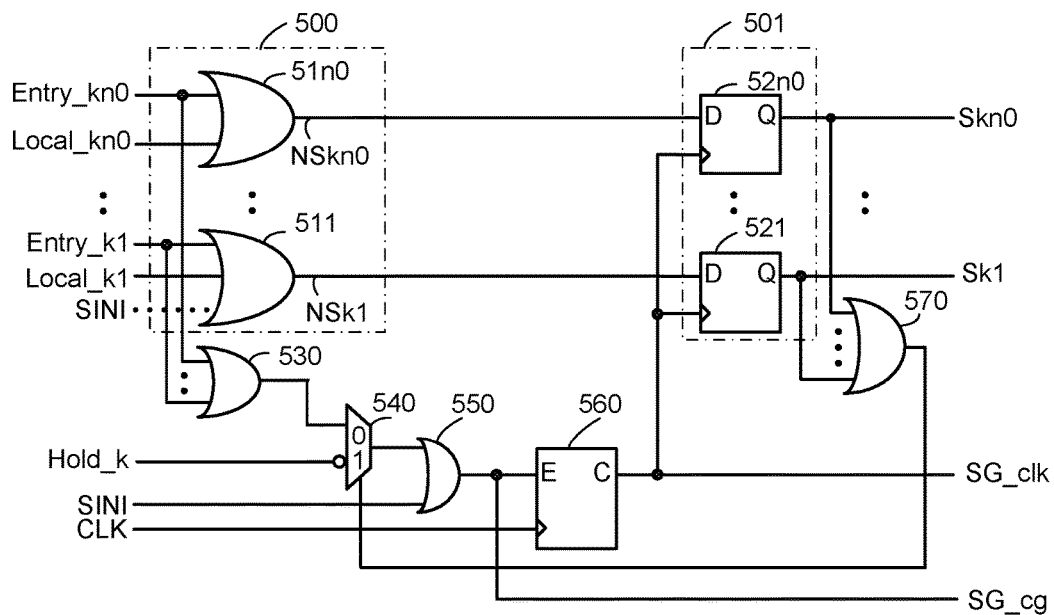
FIG. 5 is a schematic diagram for an SG in a state machine according to the second embodiment, where the group one-hot encoding method is used and the state machine has more than one SG.

FIG. 5 is a schematic diagram for an SG in a state machine according to the second embodiment, where the group one-hot encoding method is used and the state machine has more than one SG. Logic blocks 500 and 501 have the same structures as logic blocks 400 and 401 with same inputs Local_kj and Entry_kj and outputs Skj, $1<=j<=n0$, respectively, and the remaining logic in FIG. 5 is used to generate the next clock pulse that is different and simpler than the counterpart in FIG. 4. All inactive state outputs Sk1-Skn0 in FFs 521-52$n$0 are designed as the encoding pattern for the inactive status of the SG. Or-gate 530 has all combined entry jumping signals, Entry_k1-Entry_kn0, as its inputs. 2-input multiplexor 540 has its '0' input connected to the output of or-gate 530, its '1' input to the inverse of combined holding jumping signal Hold_k for the SG, its control to the output of or-gate 570. 2-input or-gate 550 has its one input connected to the output of multiplexor 540, another to input signal SINI and its output drives output signal SG_cg and enable input E to clock gating device 560. Clock gating device 560 has its clock input '>' connected to the state machine's clock source and its clock pulse output C drives output signal SG_clk and clock inputs '>' of FFs 521-52$n$0. Or-gate 570 has all state outputs Sk1-Skn0 from the SG as its inputs. If the SG is inactive, the output from or-gate 570 is deasserted; if the SG is active, the output from or-gate 570 is asserted. That property of or-gate 570 will remain true later.

Theorem 7 An SG will change states on next cycle if none of the states in the SG is active and the SG has an entry jumping signal asserted on current cycle.

Proof Based on the definition of an entry jumping signal, an entry jumping signal's current state and target state are different, and the SG has the asserted entry jumping signal's target state which will be active on next cycle from being inactive on current cycle.

Theorem 8 An SG will change states on next cycle if one state in the SG is active and the SG has the combined holding jumping signal deasserted on current cycle.

Proof The active state on current cycle will be inactive on next cycle because the SG has the combined holding jumping signal deasserted on current cycle based on the definition of the combined holding jumping signal.

Working principles for the SG circuit in FIG. 5:
1) When input signal SINI is asserted, the SG will receive a clock pulse on next cycle through clock gating device 560, because its enable input E is permanently connected to SINI through or-gate 550. The SG will be properly initialized on next cycle based on the rule that all jumping signals are deasserted when input signal SINI is asserted.
2) After the state machine is initialized, there are 5 different situations for an SG based on which type of an asserted jumping signal the SG may have on current cycle:
   a) The SG has an asserted entry jumping signal of state Skj, $0<=j<=n0$. In this situation, Entry_kj of state Skj and next state input bit NSkj are asserted, none of state outputs Sk1-Skn0 is asserted, the output of or-gate 570 is deasserted; enable input E to clock gating device 560 is asserted on current cycle, a clock pulse for FFs 521-52$n$0 will be generated, state Skj will be active and other states will be inactive on next cycle.
   b) The SG has an asserted local jumping signal of state Skj, $0<=j<=n0$. In this situation, Local_kj of state Skj and next state input bit NSkj are asserted, one of state outputs Sk1-Skn0 is asserted, the output of or-gate 570 is asserted, combined holding jumping signal Hold_k is deasserted, enable input E to clock gating device 560 is asserted on current cycle, a clock pulse for FFs 521-52$n$0 will be generated, state Skj will be active and other states will be inactive on next cycle.
   c) The SG has an asserted leaving jumping signal from the SG. In this situation, all combined entry jumping signals Entry_j and all combined local jumping signals Local_j, $1<=j<=n0$, are deasserted, one of state outputs Sk1-Skn0 is asserted, the output of or-gate 570 is asserted, combined holding jumping signal Hold_k is deasserted, enable input E to clock gating device 560 is asserted on current cycle, a clock pulse for FFs 521-52$n$0 will be generated and all states Sk1-Skn0 will be inactive on next cycle.
   d) The SG has an asserted holding jumping signal of state Skj, $0<=j<=n0$. In this situation, one of state outputs Sk1-Skn0 is asserted, the output of or-gate 570 is asserted, combined holding jumping signal Hold_k is asserted, enable input E to clock gating device 560 is deasserted on current cycle, no clock pulse for FFs 521-52$n$0 will be generated and all states Sk1-Skn0 will remain unchanged on next cycle, the active state being active and all remaining inactive states being inactive.
   e) The SG has no asserted jumping signal of or from the SG. In this situation, none of state outputs Sk1-Skn0 is asserted on current cycle based on Theorem 3, the output of or-gate 570 is deasserted, enable input E to clock gating device 560 is deasserted on current cycle, no clock pulse for FFs 521-52$n$0 will be generated and all states Sk1-Skn0 will remain inactive on next cycle.

Schematic diagram in FIG. 5 is simpler than its counterpart in FIG. 4 for an SG. The reason can be simply explained by using following code snippet for a state machine in VHDL.

```
...;
case WState is
  when Sk1 =>                      -- Sk1 /= any of Sx1, Sx2 and Sx3
    if Condition_1 then            -- local or leaving jumping signal
      WState_NS <= Sx1;
    elsif Condition_2 then         -- local or leaving jumping signal
      WState_NS <= Sx2;
    elsif Condition_3 then         -- local or leaving jumping signal
      WState_NS <= Sx3;
    else                           -- holding jumping signal of state Sk1
      WState_NS <= Sk1;
    end if;
  when Sk2 =>                      -- Sk2 /= any of Sy1, Sy2 and Sy3
    if Condition_11 then           -- local or leaving jumping signal
      WState_NS <= Sy1;
    elsif Condition_12 then        -- local or leaving jumping signal
      WState_NS <= Sy2;
    else                           -- local or leaving jumping signal
      WState_NS <= Sy3;
    end if;                        -- no holding jumping signal of state Sk2
...
```

1) For state Sk1: there are 3 local or leaving jumping signals from state Sk1 and one holding jumping signal of state Sk1. Therefore, the schematic diagram in FIG. 5 is simpler than one in FIG. 4. Generally speaking, the number of local or leaving jumping signals from a state Sj is greater than the number of holding conditions of the state Sj as shown for state Sk1. Secondly, if two or more local or leaving jumping signals from a state exist in one if-statement, their logic equations contain repeated logic.

2) For state Sk2: there is no holding jumping signal of state Sk2, so if state Sk2 is active, it should generate a clock pulse, and no local or leaving jumping signals from state Sj are needed to generate the clock pulse, further simplifying the connections.

3) Or-gate 570 is also simpler than the logic that generates combined leaving jumping signal Leave_k in FIG. 4.

The schematic diagrams in FIG. 6 to FIG. 11 are generated based on the basic schematic diagram in FIG. 5 to adapt to different situations.

Figure 6:
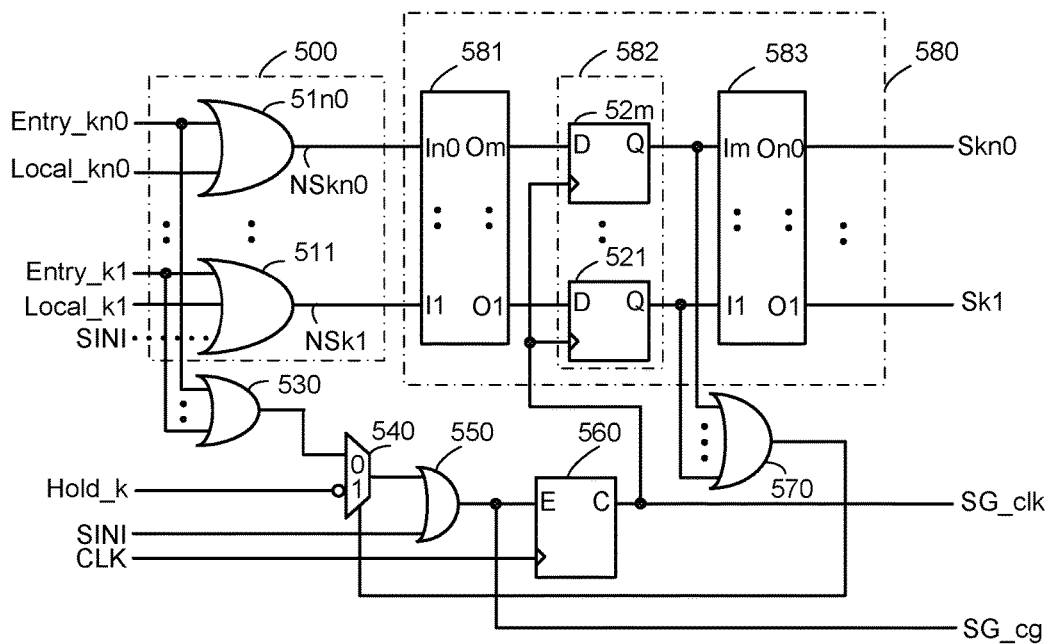
FIG. 6 is a schematic diagram for an SG in a state machine according to the third embodiment, where the group compact encoding method is used and the state machine has more than one SG.

FIG. 6 is a schematic diagram for an SG in a state machine according to the third embodiment, where the group compact encoding method is used and the state machine has more than one SG. FIG. 6 is the most preferred embodiment of the present invention. Schematic diagrams in FIG. 5 and FIG. 6 are the same except that they differ in 2 parts: a) how many bits in the state memory are used to store states Sk1-Skn0; b) how to connect or-gate 570 inputs. FIG. 6 uses the group compact encoding method and m-bits to store n0 states, where m<n0. All devices having same reference numbers in FIG. 5 and FIG. 6 play the same roles, respectively. Storing block 580 comprises 3 logic blocks: input address translation block 581, state memory block 582, and output address translation block 583. If one-to-one mapping scheme from its inputs to its outputs for block 580 is established, the structures of blocks 581 and 583 can be determined and generated. The details of the structures of blocks 581 and 583 skip. Block 581 has n0 inputs I1-In0 connected to next state input bits NSk1-NSkn0 and m-bit outputs O1-Om driving data inputs D of m FFs 521-52m, respectively. Block 582 comprises m FFs 521-52m. Block 583 has m inputs I1-Im connected to data outputs Q of m FFs 521-52m, and n0 outputs O1-On0 driving state outputs Sk1-Skn0, respectively. The n0 next state input bits NSk1-NSkn0 to block 580 have at most one or none of the n0 bits asserted, so do outputs Sk1-Sn0 from block 580.

There are five encoding and mapping rules for storing block 580 in a SG which has n0 states:

1) M-bit state memory in block 582 can represent at most (2^m−1) different states. If (2^m−1) >n0, only n0 m-bit permutations are valid and others are invalid.

2) Specify a valid m-bit permutation in block 582 for the inactive status of the SG and each of other (n0−1) valid m-bit permutations as an active state for a unique state in the SG.

3) N0 next state input bits NSk1-NSkn0 to block 581 are valid if the n0-bits have one bit or none of n0-bits asserted on current cycle.

4) Any valid permutation of n0 next state input bits to block 581 on current cycle must be mapped to the same valid permutation of n0-bit state outputs from block 583 on next cycle if a clock pulse is generated for the SG on next cycle.

5) It needs an active-inactive indicator (or-gate 570 in FIG. 6) whose inputs are fully or partially connected to the outputs of state memory block 582, and whose output is asserted if the SG has an active state, or deasserted otherwise.

In FIG. 6 the encoding pattern of all deasserted m-bits is selected for the inactive status of the SG so the active-inactive indicator is or-gate 570. Or-gate 570 has its m-bit inputs connected to m-bit outputs D from FFs 521-52m. When all m-bit outputs Q from FFs 521-52m are deasserted, or-gate 570 has its output deasserted, representing the inactive status of the SG; and when any output of m-bit outputs from FFs 521-52m is asserted, or-gate 570 has its output asserted, representing the active status of the SG, both satisfying the same output requirements as or-gate 570 in FIG. 5 does.

The working principles are the same for the SG circuits in FIG. 5 and FIG. 6.

Figures 7, 8:
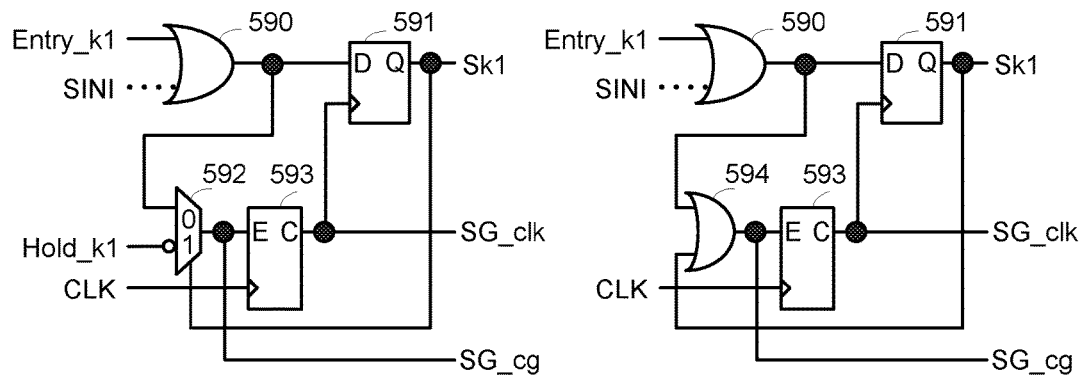
FIG. 7 is a schematic diagram of an SG in a state machine according to the fourth embodiment, where the SG has only one state Sk1, and the state machine has more than one SG.
FIG. 8 is a schematic diagram of an SG in a state machine according to the fifth embodiment, where the SG has only one state Sk1, and the state machine has more than one SG.

FIG. 7 is a schematic diagram of an SG in a state machine according to the fourth embodiment, where the SG has only one state Sk1, and the state machine has more than one SG. It is common for an SG to have only one state, so its schematic diagram is specially deduced from FIG. 5. Because the SG in FIG. 7 has only one state, all combined local jumping signals of the SG disappear. 2-input or-gate 590 exists only when state Sk1 is the initial state. Or-gate 590 has one input connected to combined entry jumping signal Entry_k1 of state Sk1, another to input signal SINI if state Sk1 is the initial state, and its output drives data input D of FF 591. FF 591 has its output Q driving state output Sk1. 2-input multiplexor 592 has its '0' input connected to the output of or-gate 590, its '1' input to the inverse of holding jumping signal Hold_k1 of state Sk1, and its control input to data output Q of FF 591. Clock gating device 593 has its input E connected to the output of multiplexor 592, and its clock pulse output C drives clock input '>' of FF 591.

Working principles for the SG circuit in FIG. 7:

1) When input signal SINI is asserted on current cycle, the SG will not receive a clock pulse on next cycle if state Sk1 is inactive and is a non-initial state; otherwise the SG will receive a clock pulse on next cycle in the following situations: a) state Sk1 is active; or b) state Sk1 is the initial state and inactive.

2) After the state machine is initialized, the working principles in FIG. 7 are similar to ones in FIG. 5 under the conditions that all combined local jumping signals disappear, and the SG has only one state Sk1.

FIG. 8 is a schematic diagram of an SG in a state machine according to the fifth embodiment, where the SG has only one state Sk1, and the state machine has more than one SG. FIG. 8 is deduced from FIG. 7 under condition that state Sk1 has no holding condition Hold_k1, or Hold_k1='0'. 2-input or-gate 594 has one input connected to the output of or-gate 590, another to state output Sk1, and its output drives enable input E of clock gating device 593. The other part of the circuit in FIG. 8 is the same as FIG. 7. The circuit simplification from FIG. 7 to FIG. 8 is due to the condition Hold_k1='0'. The working principles are the same for the SG circuits in FIG. 7 and FIG. 8.

FIG. 9 is a schematic diagram of a full state machine using the compact encoding method and a clock gating device according to the sixth embodiment. The schematic diagram in FIG. 9 is deduced from the schematic diagram in FIG. 6 under the assumptions that a) the state machine is the only one SG; and b) the states in the state machine has state S0-state Sn. All entry jumping signals Entry_k1-Entry_kn0 in FIG. 6 disappear in FIG. 9 because the state machine in FIG. 9 has only one SG. The working mechanisms for block 580 in FIG. 9 are the same as its counterpart in FIG. 6, but the part that generates next clock pulse is greatly simplified for FIG. 9. 2-input or-gate 550 has one input connected to input signal SINI, another to the inverse of combined holding jumping signal Hold for the state machine, and its output drives enable input E of clock gating device 560. The circuit in FIG. 9 has 2 essential parts that differ from a traditional compact encoded circuit for a state machine which has a clock gating device: a) a new clock pulse generating mechanism is used: a clock pulse for the state machine will be generated on next cycle if either input signal SINI is asserted or combined holding jumping signal Hold for the state machine is deasserted; b) any holding jumping signal Hold_j, $0<=j<=n$, is not part of a state input for state j.

Working principles for the state machine circuit in FIG. 9:
1) When input signal SINI is asserted on current cycle, the state machine in FIG. 9 will receive a clock pulse through clock gating device 560 and will be properly initialized on next cycle based on the rule that all jumping signals are deasserted when input signal SINI is asserted.
2) After the state machine is initialized and input signal SINI is deasserted, the state machine always has one state active. The state machine will not change states on next cycle if a holding jumping signal and combined holding jumping signal Hold for the state machine is asserted on current cycle. The state machine will change states on next cycle if a combined local jumping signal Local_j of state Sj, $0<=j<=n$, is asserted and combined holding jumping signal Hold is deasserted on current cycle, a clock pulse will be generated and state Sj will be active on next cycle.

A simplified version of the circuit in FIG. 9 also works if the circuit is generated by the one-hot encoding method, i.e., by removing blocks 581 and 583, and using n registers to replace m registers in block 582.

FIG. 10 is an optimized schematic diagram of a full state machine using the global compact encoding method and having a clock gating device according to the seventh embodiment. FIG. 10 has (n+1) states and is directly deduced from FIG. 9 with state S0 being handled as the special state. A state is called the special state in a state machine if the state does not have its own next state input bit, and the state is active if none of the other states in the state machine is active, or inactive otherwise. Any state in a state machine can be selected to be the special state based on any preferred conditions. The circuit is generated by using the global compact encoding method. Block 585 generates the next state input bit for state S0 which is not connected in the circuit, and the drawing 585 emphasizes that all special state S0's inputs are not used and disconnected. Logic block 582 has m-bits and (n+1) valid m-bit permutations to represent the (n+1) states, respectively. Combined local jumping signal Local_j of state Sj, $1<=j<=n$, is the next state input bit of state Sj. Each of the n n-bit permutations of one asserted next state input bit and (n−1) deasserted next state input bits is mapped to one of the (n+1) valid m-bit ins permutations, and the permutation of the all n deasserted next state input bits is mapped to the remaining permutation of the (n+1) valid m-bit permutations that represents the special state S0. In FIG. 10, the special state S0 is encoded as the permutation of all deasserted m-bits.

Nor-gate 586 has m-bit outputs Q from FFs 521-52m as its inputs and its output drives state output S0. Other parts with same reference numbers in FIG. 9 and FIG. 10 are the same, respectively, except that the logic block 580 is generated in compliance with the rules for the global compact encoding method whose rules have previously been defined. Generally speaking, the extra logic block 586 can be much simpler than skipped local jumping signal Local_0 of special state S0, because any state can be selected as the special state and the local jumping signal for the special state can be the most complex or have the most longest route and delay.

Working principles for the state machine circuit in FIG. 10:
1) When input signal SINI is asserted on current cycle, the state machine in FIG. 10 will receive a clock pulse through clock gating device 560 and will be properly initialized on next cycle based on the rule that all jumping signals are deasserted when input signal SINI is asserted.
2) After the state machine is initialized and input signal SINI is deasserted, the state machine always has one state active. There are three situations on current cycle:
    a) The state machine has one local jumping signal Local_S0 asserted. In this situation, all other local jumping signal Local_Sj of state Sj, $1<=j<=n$, and combined holding jumping signal Hold are deasserted on current cycle, a clock pulse will be generated and state S0 will be active on next cycle.
    b) The state machine has one local jumping signal Local_Sj of state Sj asserted, $1<=j<=n$. In this situation, combined holding jumping signal Hold is deasserted, a clock pulse will be generated and state Sj will be active on next cycle.
    c) The state machine has a holding jumping signal asserted of any state Sj, $0<=j<=n$. In this situation, combined holding jumping signal Hold is asserted, no clock pulse will be generated and the current active state Sj will remain active and other non-active states will remain inactive on next cycle.

FIG. 11 is an optimized schematic diagram of a full state machine using the global one-hot encoding method and having a clock gating device according to the eighth embodiment. FIG. 11 is directly deduced from FIG. 10 by removing input address translation block 581 and output address translation block 583. In FIG. 11 the state machine has n-bit memory and (n+1) n-bit permutations to remember states S0-Sn, respectively. Combined local jumping signal Local_j of state Sj, $1<=j<=n$, is the next state input bit of state Sj. Each of the n n-bit permutations of one asserted next state input bit and (n−1) deasserted next state input bits is mapped to one of the (n+1) valid n-bit permutations, and the permutation of the all n deasserted next state input bits is mapped to the remaining permutation of the (n+1) valid n-bit permutations that represents the special state S0. In FIG. 11, the special state S0 is encoded as the permutation of all deasserted n-bits. Special state S0 does not have its next state input bit and its individual FF, and is generated through nor-gate 586. Nor-gate 586 has state outputs S1-Sn as its inputs and its output drives state output S0. State output S0 is asserted if none of state outputs S1-Sn is active, or deasserted otherwise. The working principles for the circuits in FIG. 10 and FIG. 11 are the same.

The circuit for an SG in a state machine can be generated by using any combinations of embodiments from FIG. 4 to FIG. 11 that is decided by a synthesizer, not by a code designer.

The subject matter recited in the claims should be understood in light of this detailed written description, which should be read in conjunction with the accompanying drawings. This description of one or more particular embodiments, set out above to enable one to build and use various implementations of the technology set forth by the claims, is not intended to limit the enumerated claims, but to exemplify their application to certain methods and devices.

The inventor can be reached by email: wtxwtx@gmail.com.

What is claimed is:

1. A method for generating a circuit for a state machine, comprising:
dividing a plurality of states into a plurality of state groups, and each state group of the plurality of state groups comprising at least one state in the plurality of states;
defining a plurality of jumping signals, a currently asserted jumping signal in the plurality of jumping signals making the state machine jump from a current state of the currently asserted jumping signal to a target state of the currently asserted jumping signal on a next cycle;
classifying a jumping signal of the plurality of jumping signals of each state group of the plurality of state groups into one of three categories, the three categories comprising:
a true jumping signal when the current state and the target state of the jumping signal of the plurality of jumping signals are different, and the target state of the jumping signal of the plurality of jumping signals belongs to the each state group of the plurality of state groups;
a holding jumping signal when the current state and the target state of the jumping signal of the plurality of jumping signals are the same and both belong to the each state group of the plurality of state groups; and
a leaving jumping signal when the current state of the jumping signal of the plurality of jumping signals belongs to the each state group of the plurality of state groups, and the target state of the jumping signal of the plurality of jumping signals does not belong to the each state group of the plurality of state groups;
feeding each state of the plurality of states with at least one true jumping signal of a plurality of the true jumping signals, and the each state of the plurality of states being a common target state of the at least one true jumping signal of the plurality of the true jumping signals;
feeding an initial state in the plurality of states with a synchronous initialization input signal SINI for the state machine;
remembering each state group of the plurality of state groups by one corresponding memory group of a plurality of memory groups;
attaching each memory group of the plurality of memory groups with one corresponding clock gating device of a plurality of clock gating devices;
generating a clock pulse for a memory group of the plurality of memory groups on the next cycle when one of two first conditions is satisfied, the two first conditions comprising:
the synchronous initialization input signal SINI for the state machine is asserted on a current cycle; or
one state group of the plurality of state groups will make a state change on the next cycle, and the one state group of the plurality of state groups is remembered by the memory group of the plurality of memory groups; and
generating a plurality of state outputs from the plurality of memory groups.

2. The method of claim 1 further comprising:
defining the plurality of jumping signals, each jumping signal of the plurality of jumping signals further comprising following three characteristics:
the each jumping signal of the plurality of jumping signals has a transfer function;
the each jumping signal of the plurality of jumping signals is deasserted when the synchronous initialization input signal SINI for the state machine is asserted; and
one and only one jumping signal of the plurality of jumping signals is asserted on the current cycle after the state machine has been initialized.

3. The method of claim 1 further comprising:
generating each jumping signal Tij of the plurality of jumping signals based on a logic expression:

$$Tij = (\text{not } SINI) \text{ and } Si \text{ and } F(x); \text{ where}$$

signal SINI is the synchronous initialization input signal for the state machine;
state Si is the current state of the each jumping signal of the plurality of jumping signals;
transfer function $F(x)$ maps at least one input signal x of the state machine to a bit signal, and the at least one input signal x does not comprise information of the state machine; and
index j of the each jumping signal Tij of the plurality of jumping signals indicates that a state Sj with index j in the plurality of states is the target state of the each jumping signal Tij of the plurality of jumping signals.

4. The method of claim 1 further comprising:
determining the state change for one state group of the plurality of state groups, the state change happening on the next cycle when one true jumping signal of the at least one true jumping signal for the one state group of the plurality of state groups is asserted on the current cycle.

5. The method of claim 1 further comprising:
determining the state change for one state group of the plurality of state groups, the state change happening on the next cycle when one leaving jumping signal of the at least one leaving jumping signal for the one state group of the plurality of state groups is asserted on the current cycle.

6. The method of claim 1 further comprising:
classifying each true jumping signal of the at least one true jumping signal for one state group of the plurality of state groups into one of two categories, the two categories comprising:
an entry jumping signal when the current state of the each true jumping signal of the at least one true jumping signal does not belong to the one state group of the plurality of state groups; and
a local jumping signal when the current state of the each true jumping signal of the at least one true jumping signal belongs to the one state group of the plurality of state groups.

7. The method of claim 6 further comprising:
determining the state change for one state group of the plurality of state groups, the state change happening on the next cycle when both of two second conditions are satisfied on the current cycle, the two second conditions comprising:
the one state group of the plurality of state groups is inactive; and
one entry jumping signal of the at least one entry jumping signal for the one state group of the plurality of state groups is asserted.

8. The method of claim 1 further comprising:
determining the state change for one state group of the plurality of state groups, the state change happening on the next cycle when both of two second conditions are satisfied on the current cycle, the two second conditions comprising:
the one state group of the plurality of state groups is active; and
none of the at least one holding jumping signal for the one state group of the plurality of state groups is asserted.

9. The method of claim 1 further comprising:
generating any state group of the plurality of state groups using a group one-hot encoding method.

10. The method of claim 1 further comprising:
generating any state group of the plurality of state groups using a group compact encoding method.

11. The method of claim 1 further comprising:
grouping at least one state in the plurality of states into one state group in the plurality of state groups by a pair of parentheses, the grouping covering all states in the plurality of states, and each state in the plurality of states belonging to only one state group in the plurality of state groups;
coding all state groups of the plurality of state groups in a declaration statement in Hardware Description Language (HDL), the declaration statement in HDL declaring the state machine.

12. The method of claim 11 further comprising:
attaching each state group of the plurality of state groups with a corresponding state group name.

13. A method for generating a circuit for a state machine, comprising:
defining a plurality of jumping signals, a currently asserted jumping signal in the plurality of jumping signals making the state machine jump from a current state of the currently asserted jumping signal to a target state of the currently asserted jumping signal on a next cycle;
classifying each jumping signal of the plurality of jumping signals into one of two categories, the two categories comprising:
a local jumping signal when the current state and the target state of the each jumping signal of the plurality of jumping signals are different; and
a holding jumping signal when the current state and the target state of the each jumping signal of the plurality of jumping signals are the same;
dividing a plurality of states into two state groups, a first state group of the two state groups comprising only a special state in the plurality of states, and a second state group of the two state groups comprising at least one remaining state in the plurality of states;
feeding each state in the second state group with the at least one local jumping signal, and the each state in the second state group being the common target state of the at least one local jumping signal;
feeding an initial state in the plurality of states with a synchronous initialization input signal SINI for the state machine when the initial state belongs to the second state group;
storing the second state group in at least one memory bit;
attaching the at least one memory bit with a clock gating device;
generating a clock pulse for the at least one memory bit on the next cycle when either of two conditions is satisfied, the two conditions comprising:
the synchronous initialization input signal SINI for the state machine is asserted on a current cycle; or
none of the at least one holding jumping signal is asserted on the current cycle; and
generating a plurality of state outputs from the at least one memory bit.

14. The method of claim 13 further comprising:
generating each jumping signal Tij of the plurality of jumping signals based on a logic expression:

$Tij = (\text{not } SINI) \text{ and } Si \text{ and } F(x);$ where signal SINI is the synchronous initialization input signal for the state machine;
state Si is the current state of the each jumping signal of the plurality of jumping signals;
transfer function F(x) maps at least one input signal x of the state machine to a bit signal, and the at least one input signal x does not comprise information of the state machine; and
index j of the each jumping signal Tij of the plurality of jumping signals indicates that a state Sj with index j in the plurality of states is the target state of the each jumping signal of the plurality of jumping signals.

15. The method of claim 13 further comprising:
defining a special state output in the plurality of state outputs for the special state in the plurality of states, the special state output in the plurality of state outputs being asserted when none of other state outputs in the plurality of state outputs is asserted.

16. The method of claim 13 further comprising:
generating the circuit of the state machine using a global one-hot encoding method.

17. The method of claim 13 further comprising:
generating the circuit of the state machine using a global compact encoding method.

* * * * *